(12) United States Patent
Prendergast

(10) Patent No.: US 11,716,965 B2
(45) Date of Patent: *Aug. 8, 2023

(54) PRESSURE ACTIVATED RECHARGING COOLING PLATFORM

(71) Applicant: THE GREEN PET SHOP ENTERPRISES, LLC, Deerfield, IL (US)

(72) Inventor: Gerard Prendergast, Chicago, IL (US)

(73) Assignee: THE GREEN PET SHOP ENTERPRISES, LLC, Deerfield, IL (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/540,395

(22) Filed: Dec. 2, 2021

(65) Prior Publication Data

US 2022/0095580 A1 Mar. 31, 2022

Related U.S. Application Data

(63) Continuation of application No. 15/850,700, filed on Dec. 21, 2017, now Pat. No. 11,219,191, which is a
(Continued)

(51) Int. Cl.
*F25D 3/02* (2006.01)
*A01K 1/015* (2006.01)
*A01K 1/035* (2006.01)

(52) U.S. Cl.
CPC .......... *A01K 1/0158* (2013.01); *A01K 1/0353* (2013.01); *F25D 3/02* (2013.01); *F25D 2303/08* (2013.01); *F25D 2303/085* (2013.01)

(58) Field of Classification Search
CPC ...... A01K 1/0158; A01K 1/0353; F25D 3/02; F25D 2303/08; F25D 2303/085
See application file for complete search history.

(56) References Cited

U.S. PATENT DOCUMENTS 3,208,877 A 9/1965 Merry
4,064,835 A 12/1977 Rabenbauer
(Continued)

FOREIGN PATENT DOCUMENTS

CN 1493644 A 5/2004
CN 101305877 A 11/2008
(Continued)

OTHER PUBLICATIONS

Inside Technogel—discover life made comfortable, 6 pages, https://us.technogelworld.com/the-gel/[Oct. 7, 2020 3:16:06 PM].
(Continued)

*Primary Examiner* — Filip Zec
(74) *Attorney, Agent, or Firm* — Carlson, Gaskey & Olds, P.C.

(57) ABSTRACT

A pressure activated recharging cooling platform for cooling an object is provided. The cooling platform comprises a temperature regulation layer, a support layer, and a channeled covering layer. The temperature regulation layer is adapted to hold a composition. The temperature regulation layer has a plurality of angled segments, wherein angled segments within a sealed perimeter of the temperature regulation layer are formed by a top side and a bottom side at a predefined distance, and channels, wherein the channels substantially form sides by contacting the top side with the bottom side at a distance lesser than the predefined distance. The support layer is substantially bonded to the bottom side of the temperature regulation layer and is comprised of material sufficiently pliable to deform and sufficiently rigid to withstand collapse in response to the weight of the object. The channeled covering layer encompasses the support and temperature regulation layers.

20 Claims, 7 Drawing Sheets

Related U.S. Application Data continuation of application No. 14/695,909, filed on Apr. 24, 2015, now abandoned, which is a continuation of application No. 14/226,393, filed on Mar. 26, 2014, now Pat. No. 9,226,474, which is a continuation of application No. 12/760,045, filed on Apr. 14, 2010, now Pat. No. 8,720,218.

(56) References Cited

U.S. PATENT DOCUMENTS

| | | | |
|---|---|---|---|
| 4,422,194 A | 12/1983 | Viesturs et al. | |
| 4,884,304 A * | 12/1989 | Elkins | A47C 21/044 |
| | | | 607/104 |
| 5,261,241 A | 11/1993 | Kitahara et al. | |
| 5,632,051 A * | 5/1997 | Stanley | A47C 27/085 |
| | | | 5/636 |
| 5,755,110 A | 5/1998 | Silvas | |
| 6,128,795 A | 10/2000 | Stanley et al. | |
| 6,132,455 A | 10/2000 | Shang | |
| 6,210,427 B1 | 4/2001 | Augustine et al. | |
| 6,226,820 B1 | 5/2001 | Navarro | |
| 6,482,332 B1 | 11/2002 | Malach | |
| 6,491,717 B1 * | 12/2002 | Stanley | A61H 23/04 |
| | | | 607/104 |
| 6,677,026 B1 | 1/2004 | Yates | |
| 6,855,410 B2 * | 2/2005 | Buckley | A41D 31/065 |
| | | | 428/313.5 |
| 7,036,162 B1 | 5/2006 | Gatten | |
| 7,324,340 B2 | 1/2008 | Xiong | |
| 7,358,282 B2 | 4/2008 | Krueger et al. | |
| 7,780,713 B2 | 8/2010 | Roberts | |
| 8,381,495 B2 | 2/2013 | Fan et al. | |
| 8,434,748 B1 * | 5/2013 | Pearce | A47C 27/20 |
| | | | 5/655.5 |
| 9,572,431 B2 * | 2/2017 | Khanzadian | B29C 39/26 |
| 10,470,583 B2 * | 11/2019 | Gross | A47C 27/15 |
| 10,912,986 B2 * | 2/2021 | Briggs | A63C 5/126 |
| 2005/0288749 A1 | 12/2005 | Lachenbruch | |
| 2006/0272581 A1 | 12/2006 | Dunn et al. | |
| 2007/0061978 A1 | 3/2007 | Losio | |
| 2007/0246157 A1 * | 10/2007 | Mason | A47C 27/15 |
| | | | 264/299 |
| 2008/0053109 A1 | 3/2008 | Quincy et al. | |
| 2009/0088825 A1 | 4/2009 | Ota | |
| 2009/0132013 A1 | 5/2009 | Amalfi | |
| 2010/0009128 A1 | 1/2010 | Fan et al. | |
| 2010/0280582 A1 | 11/2010 | Baker et al. | |
| 2011/0139406 A1 | 6/2011 | Rizzo | |
| 2018/0352980 A1 * | 12/2018 | Casali, Jr. | D06M 23/12 |

FOREIGN PATENT DOCUMENTS

| | | |
|---|---|---|
| CN | 201452402 U | 5/2010 |
| JP | 2002233442 A | 8/2002 |
| JP | 3088754 U | 9/2002 |
| JP | 3115093 U | 11/2005 |
| KR | 20060097360 A | 9/2006 |
| KR | 100945294 B1 | 3/2010 |
| WO | 2009060876 A1 | 5/2009 |

OTHER PUBLICATIONS

Maze's LPR 2.3 initial non-infringement and invalidity contentions; US District Court Northern District of Illinois Eastern Division, case No. 1:15-cv-01138; filed Jun. 24, 2015.

Maze's Petition for Inter Partes Review of U.S. Pat. No. 8,720,218; United States Patent and Trademark Office in the United States Patent Trial and Appeal Board, IPR2016-00117, filed Oct. 30, 2015.

*The Green Pet Shop Enterprises LLC v Comfort Revolution, LLC*, In the United States District Court for the District of New Jersey, Civil Action No. 3:20-cv-02130, Appendix A to Defendants/Counterclaimant's Initial Invalidity Contentions.

*The Green Pet Shop Enterprises LLC v Comfort Revolution, LLC*, In the United States District Court for the District of New Jersey, Civil Action No. 3:20-cv-02130, Appendix B to Defendants/Counterclaimant's Initial Invalidity Contentions.

*The Green Pet Shop Enterprises LLC v Comfort Revolution, LLC*, In the United States District Court for the District of New Jersey, Civil Action No. 3:20-cv-02130, Comfort Revolution, LLC's Invalidity Contentions.

Wikipedia. Le Chatelier's principle. https://en.wikipedia.org/wiki/Le_Chatelier%27s_principle#Effect_of_change_in_pressure.

* cited by examiner

US 11,716,965 B2

PRESSURE ACTIVATED RECHARGING COOLING PLATFORM

CROSS-REFERENCE TO RELATED APPLICATIONS

This is a continuation of U.S. application Ser. No. 15/850,700, filed on Dec. 21, 2017, which is a continuation of U.S. application Ser. No. 14/695,909, filed on Apr. 24, 2015, which is a continuation of U.S. application Ser. No. 14/226,393, filed on Mar. 26, 2014, now U.S. Pat. No. 9,226,474, which is a continuation of U.S. application Ser. No. 12/760,045, filed on Apr. 14, 2010, now U.S. Pat. No. 8,720,218. The contents of all related applications are incorporated by reference in their entirety herein.

BACKGROUND

1. Field of the Invention

The invention relates to temperature controlled platforms, particularly, cooling platforms for animals.

2. Discussion of the Related Art

Pet beds serve as a place to rest or sleep, for pets such as cats and dogs. Many times, depending on the application, these pet beds are directed towards cooling or heating pets. These beds can be used during post-surgery recovery, dysplasia, or post-chemotherapy. Generally, these pet beds aid in the comfort and safety of the pet.

Many pet beds are known to have cooling mechanisms. Some pet beds provide a centralized cooling plate with no mechanism to circulate. These pet beds are electrically connected to a power source. Power sources often times fail, negating the "portable" aspect of a product. Further, such systems require heavy and complex equipment, and are not typically portable or user friendly.

There are other pet beds available which use alternative or "non-electric" means to cool a pet. These pet beds generally use ice packs. However, these ice packs eventually melt and need to be replaced. Accordingly, it is desirable to provide an improved cooling bed for pets.

BRIEF DESCRIPTION OF THE DRAWINGS

The invention is described by way of example with reference to the accompanying drawings wherein.

DETAILED DESCRIPTION

The present invention is now described with reference to figures where like reference numbers indicate identical or functionally similar elements. While specific configurations and arrangements are discussed, it should be understood that this is done for illustrative purposes only. A person skilled in the relevant art will recognize that other configurations and arrangements can be used without departing form the spirit and scope of the invention.

The invention described herein is multilayered. Each layer, in an embodiment, is bonded to the next layer in some fashion, in that, each layer is comprised of a first and a second side and is bonded to the respective side accordingly. As such, the term "bonded" refers to the joining, adhering, affixing, connecting, attaching, threading or the like, through chemical, mechanical or electrical avenues, of at least two elements of a cooling platform, such that the elements tend to be and remain bonded during normal use conditions of the cooling platform.

Figure 1:
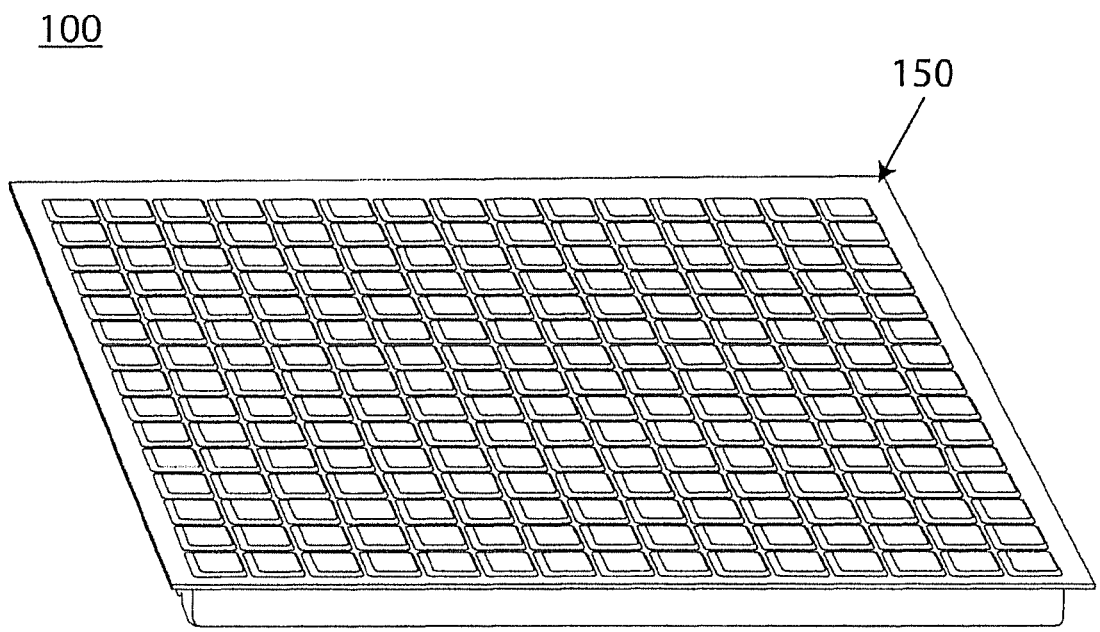
FIG. 1 illustrates a top angled perspective of a cooling platform.

FIG. 1 illustrates a cooling platform 100. The cooling platform 100 is comprised of a temperature regulation layer 110 (illustrated in FIG. 2), a support layer 140 (illustrated in FIG. 3), and a channeled covering layer 150.

Figure 2:
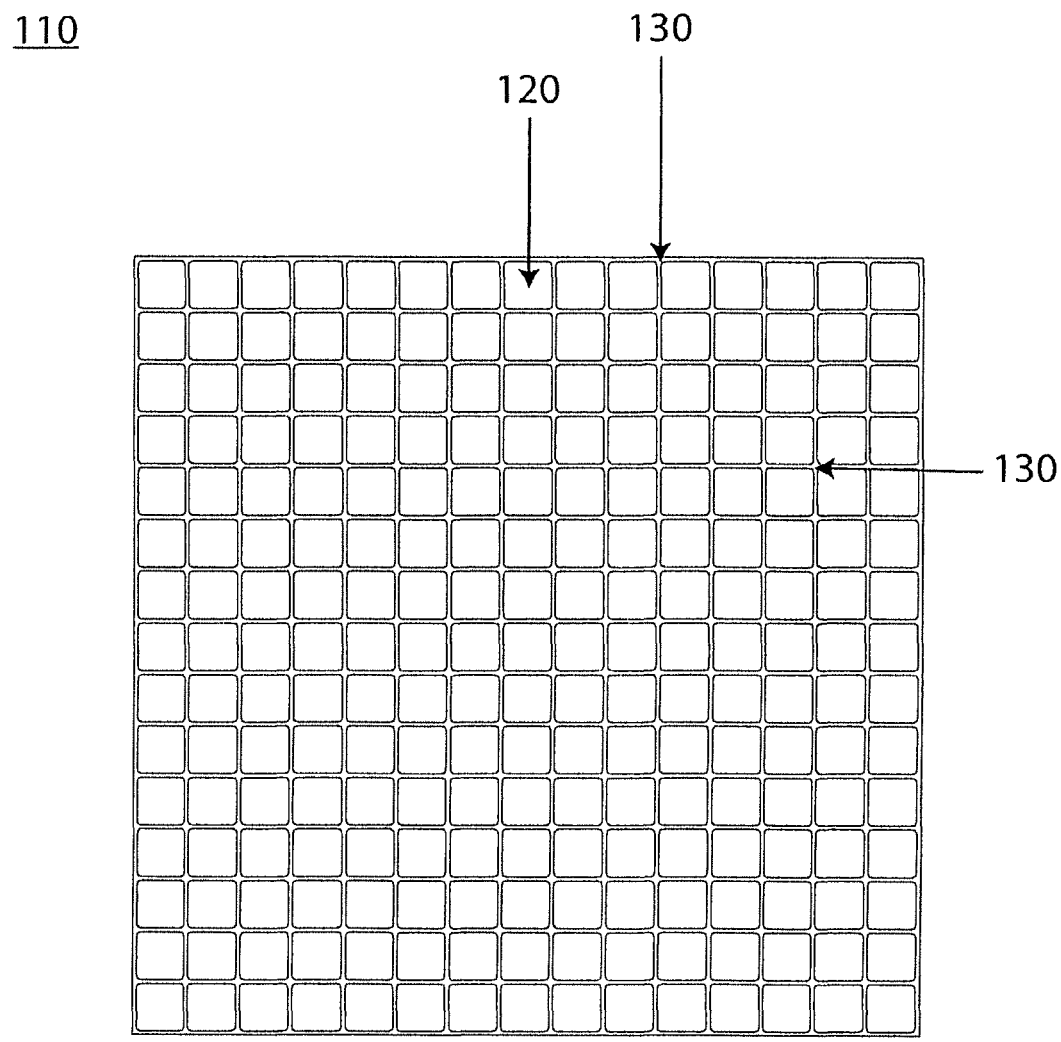
FIG. 2 illustrates a top view of a temperature regulation layer of the cooling platform.

FIG. 2 illustrates the temperature regulation layer 110 in more detail. The temperature regulation layer 110 is adapted to hold a composition 110A (illustrated in FIG. 3) and provides temperature regulation to the cooling platform 100. The temperature regulation layer 110 has an angled segment 120, which includes a top side and a bottom side (illustrated FIG. 8 and FIG. 9). The angled segment 120 is formed by channels 130 and includes a sealed perimeter.

In an embodiment, and as illustrated in FIG. 2, the temperature regulation layer 110 includes a plurality of angled segments 120 formed by a plurality of channels 130. The channels 130 effectively space the top and bottom sides of each angled segment 120 at a predefined distance. In an embodiment, the predefined distance can equal zero, thus completely forming each angled segment 120 and cutting off any interconnection or communication therein.

Figure 6:
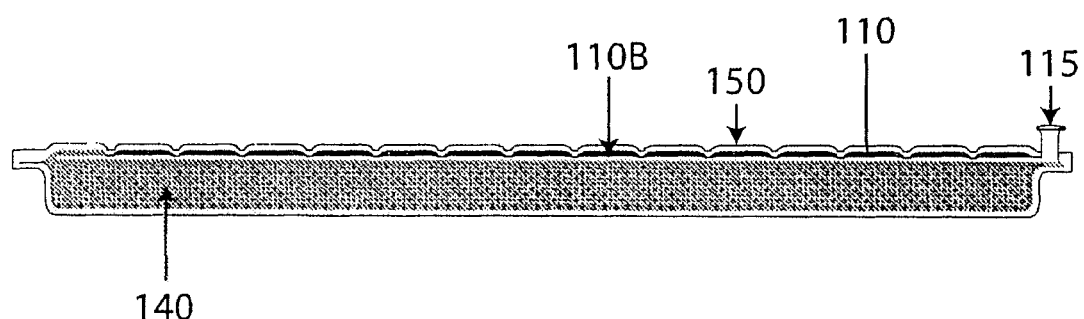
FIG. 6 illustrates a detailed cross-sectional view of an alternative embodiment of the cooling platform.
Figure 7:
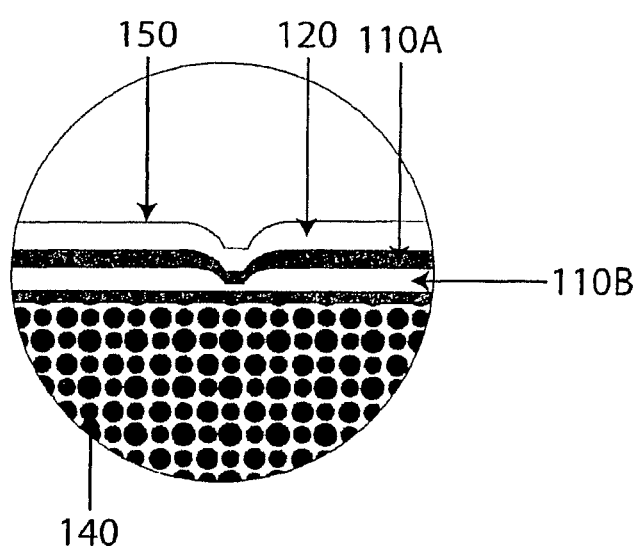
FIG. 7 illustrates a detailed cross-sectional view of the alternative embodiment of the cooling platform.

In another embodiment, that predefined distance can be measured depending on the object using the cooling platform 100. In this embodiment, the predefined distance allows for interconnection between the angled segments 120 of the composition 110A (including pressure portions 110B as seen in FIG. 6 and FIG. 7). In this embodiment, the interconnection would apply to those angled segments 120 within the perimeter of the temperature regulation layer 110, as the perimeter is sealed.

The cooling platform 100 is adapted to provide cooling to a wide variety of objects. As used herein, the term "object" can mean a variety of things including but not limited to domestic animals, such as cats and dogs. The use of the cooling platform 100 can extend to human use in vehicles or similar circumstances calling for such regulation. Generally, the cooling platform 100 can be used for anything that needs or requires either heat, cool or temperature regulation.

Figure 3:
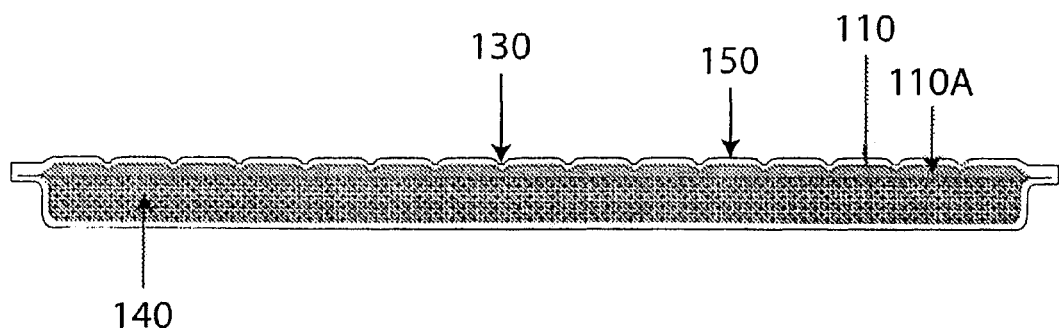
FIG. 3 illustrates a cross-sectional view of the cooling platform.
Figure 4:
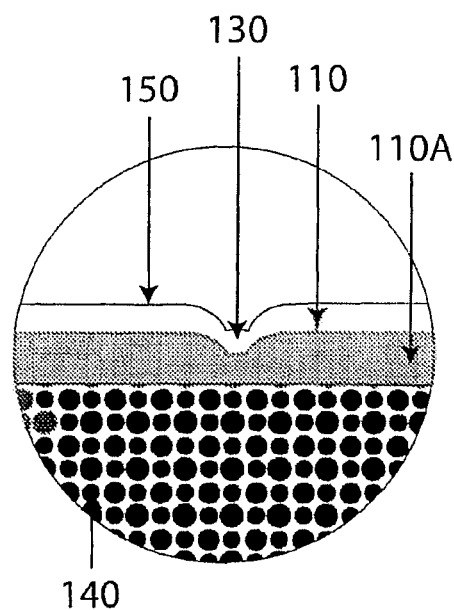
FIG. 4 illustrates a detailed cross-sectional view of the cooling platform.

FIG. 3 and FIG. 4 illustrate a cross-section of the cooling platform 100, which includes the support layer 140. The support layer 140 is substantially bonded to the bottom side of the temperature regulation layer 110. The support layer 140 comprised of material sufficiently pliable to deform and sufficiently rigid to withstand collapse in response to the weight of the object.

In an embodiment, the support layer 140 can be made from polyurethane foam, elastomer foam, memory foam, or other suitable material. In another embodiment, the support layer 140 is made of an orthopedic foam, of a consistency designed to protect joints and provide appropriate support to the skeletal system.

In an embodiment, the support layer 140 can include soft, pliable, and removable stuffing material to provide cushioning, allowing a user to establish the firmness or softness desired. Such material can include synthetic pillow stuffing such as polyester filling, or can include feathers such as goose or duck down. As a further embodiment, the support layer 140 can include a combination of dense foam and softer pillow stuffing. It is contemplated that different types of cushioning can be utilized for different types, sizes, and weight of objects.

FIG. 3 and FIG. 4 further illustrate the composition 110A within the temperature regulation layer 110. The composition 110A serves to control the temperature of the cooling platform 100. The cooling platform 100 can handle a range of different temperatures depending on the object in use. This can mean that the composition 110A can encompass a variety of cooling and heating compounds.

In an embodiment, the composition 110A can be activated by a wide variety of means, e.g., the addition of water. In this embodiment, the composition 110A can include ammonium nitrate and distilled water.

In another embodiment, the composition 110A can be activated by pressure, wherein the pressure of an object sitting on the cooling platform 100 activates the composition 110A, triggering an endothermic process and subsequent cooling. Upon the release of that pressure, the composition 110A undergoes a subsequent recharge, essentially the reverse of the initial reaction. The above is consistent with Le Chatelier's principle, in that, the reaction reverses upon the application or absence of pressure. In this embodiment, the composition 110A is comprised of: thirty percent carboxymethyl cellulose; twenty percent water; thirty-five percent polyacrylamide; and at least fifteen percent alginic acid. The aforementioned composition 110A also provides a cooling effect for an increased duration over other known compositions.

Figure 5:
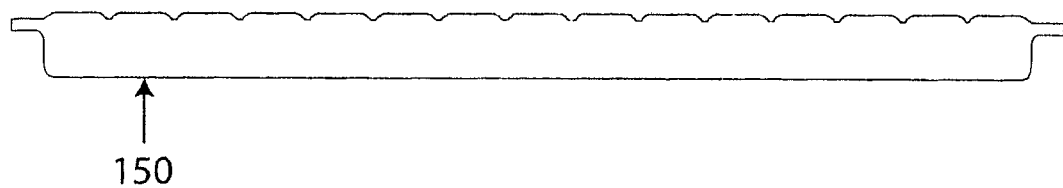
FIG. 5 illustrates a cross-sectional view of a channeled covering layer of the cooling platform.

FIG. 5 illustrates a cross-section of the channeled covering layer 150. The channeled covering layer 150 can encompass both the support 140 and temperature regulation layers 110. The channeled covering layer 150 can comprise a piece of fabric or netting, which can include, but is not limited to, plastic, nylon or cloth netting, or a micro-fiber material with a waterproof layer.

The fabric or netting can allow circulated air to penetrate and escape to the surface, effectuating the cooling process. The fabric or netting can be air tight or resistant to air penetration, to provide indirect cooling. In another embodiment, the channeled covering layer 150 can be made of a firm material, such as plastic, which retains its shape when sat upon by an object. Additionally, the channeled covering layer 150 can include padding to provide a comfortable seating surface.

In an embodiment, the channeled covering layer 150 can be easily removed via a bottom and/or zipper or any other similar means attached thereto. The channeled covering layer 150 can be made of material such that it can be easily replaced with a different top portion made of another material (and/or having different thickness) as desired. Further, in an embodiment, the channeled covering layer 150 can contain antibacterial, stain resistant, chew resistant, and/or anti flea materials.

FIG. 6 and FIG. 7 illustrate an alternative embodiment of the invention. In this embodiment, the temperature regulation layer 110 includes a pressure portion 110B. The pressure portion 110B allows for the ability to increase or decrease the firmness of the temperature regulation layer 110 and thus the cooling platform 100 by the addition of gases such as oxygen. This feature can be predetermined or varied as set forthbelow.

In an embodiment, the pressure portion 110B can include a means for inflating or deflating 115 the pressure portion 110B and the temperature regulation layer 110. The means for inflating and deflating 115 can include a variety of structures designed for air intake and out take. Often, the structures involved in such means include a protruding valve stem and a cap. The valve stem can be connected or coupled with a threaded portion for attachment to a mechanical or electrical pump, or can be comprised of a plastic valve allowing for human pressure inflation.

In an embodiment, the means for inflating or deflating can interconnect the pressure portions 110B held within the plurality of angled segments 120. In another embodiment, each pressure portion 110B can be provided for individually within each angled segment 120 at either a fixed pressure or established using the above mentioned interconnected means.

Figure 8:
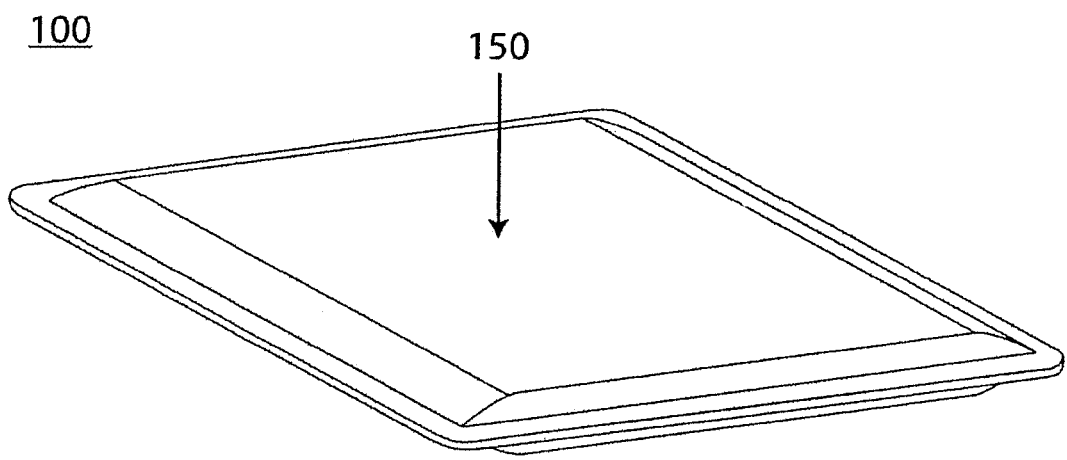
FIG. 8 illustrates a top angled perspective of an alternative embodiment of the cooling platform.
Figure 9:
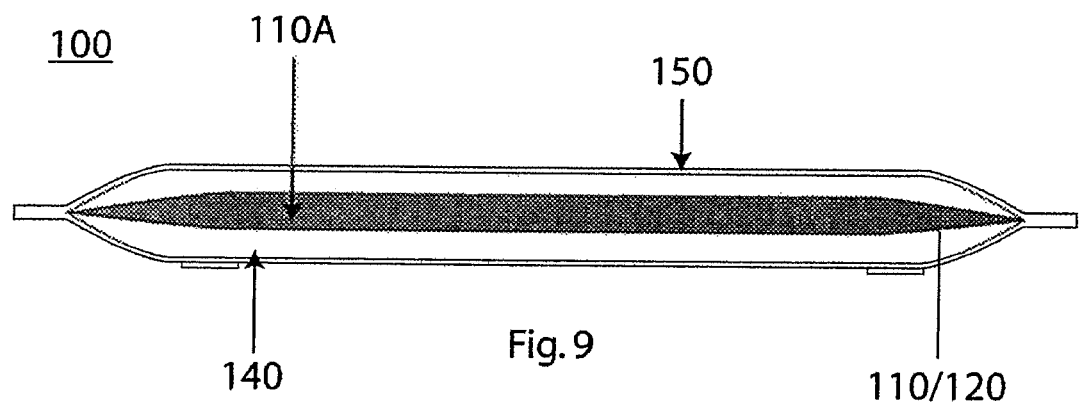
FIG. 9 illustrates a cross-sectional perspective of the alternative embodiment of the cooling platform.

FIG. 8 and FIG. 9 illustrate an alternative embodiment of the invention. In this embodiment, the temperature regulation layer 110 is adapted to hold a composition 110A in a single angled segment 120. Therefore, the temperature regulation layer 110 becomes the single angled segment 120. The perimeter of the angled segment 120, which includes a top side and a bottom side, is sealed preventing the composition 110A from leaking.

Figure 10:
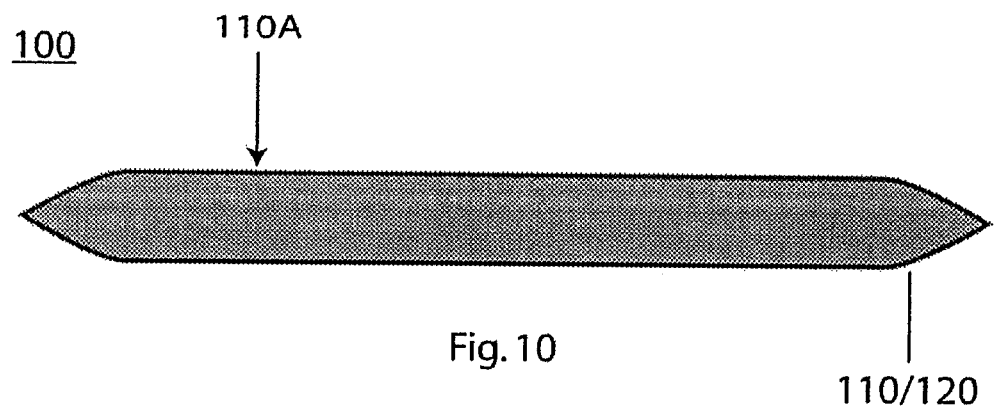
FIG. 10 illustrates a cross-sectional perspective of an alternative embodiment of the cooling platform.
Figure 11:
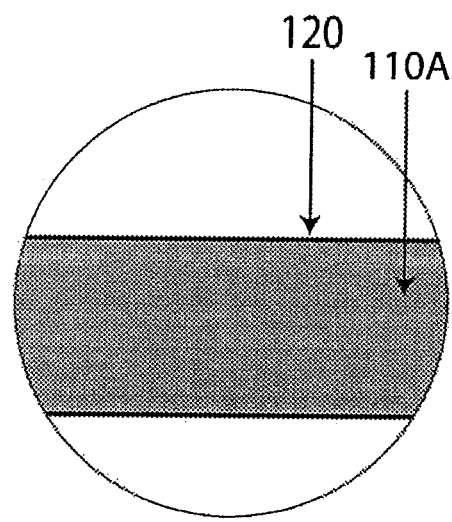
FIG. 11 illustrates a detailed cross-sectional view of the alternative embodiment of the cooling platform.

FIGS. 10 and 11 illustrate another alternative embodiment of the invention. In this particular embodiment, the temperature regulation layer 110/120 is adapted to hold the composition 110A. In this embodiment, the temperature regulation layer 110/120 has an angled segment 120 formed as described herein. However, this embodiment does not include the channeled covering layer 150 as well as support layer 140.

Figure 12:
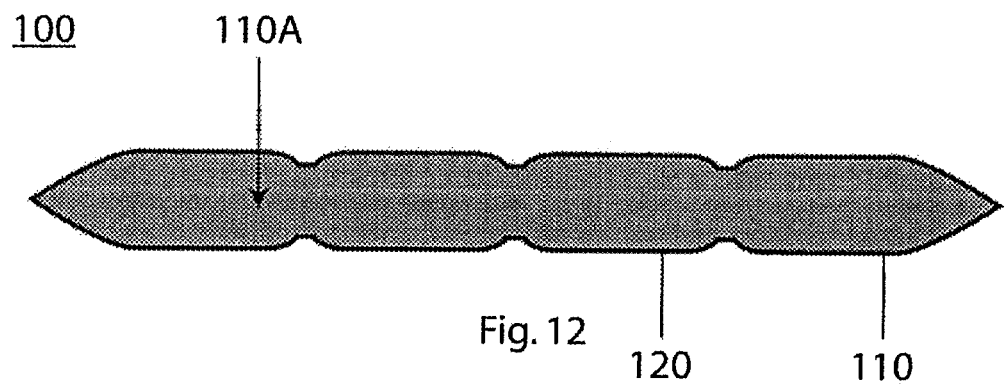
FIG. 12 illustrates a cross-sectional perspective of an alternative embodiment of the cooling platform.
Figure 13:
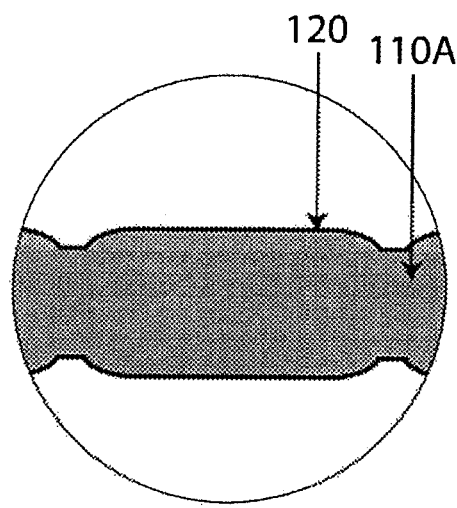
FIG. 13 illustrates a detailed cross-sectional view of the alternative embodiment of the cooling platform.

FIGS. 12 and 13 illustrate another embodiment of the invention. In this embodiment, the temperature regulation layer 110 adapted to hold the composition 110A, has a plurality of angled segments 120. And as already described herein, the angled segments 120 are formed by a top side and a bottom side at a predefined distance, and by channels 130. In an embodiment, the channels 130 may completely segment the plurality of angled segments 120.

As mentioned in conjunction with the channeled covering layer 150, the temperature regulation layer 110 may be comprised of similar materials making up the channeled covering layer 150. The temperature regulation layer 110, in an embodiment, may also be plastic or of similar material, and in another embodiment be such that the composition 110A is viewable through clear material.

In use, the cooling platform 100 is able to regulate the temperate of an object. The object contacts the channeled covering layer 150 exerting pressure over the cooling platform 100. The support layer 140 is designed to be sufficiently pliable to deform and sufficiently rigid to withstand collapse in response to the weight of the object. As stated herein, the support layer 140 can be comprised of a wide variety of components.

Depending on the composition 110A used, the temperature regulation layer 110 transfers heat from the object. In further effectuating heat transfer, the channels 130 have at least two advantages. First, the channels 130 are designed to mix air with the cooling process between the object and the channeled covering layer 150. Second, the channels 130 substantially prevent or minimize the composition 110A from being pushed out of the angled segment 120. Obviously, in other embodiments presented herein, the angled segments 120 can be completely segmented, fully preventing such an issue. The channeled covering layer 150 also aids in effectuating heat transfer from the object by its composition of channels. Of course, the degree of such aid depends in large part on the type of material used with the cooling platform 100.

In adjusting to accommodate the object, the pressure portions 110B are used. As stated above, the pressure portions 110B can be individual and predetermined or variable and interconnected. Thus, the interconnected pressure portions 110B can be varied through the means for inflating and deflating 115. Also, as stated herein, the channeled covering layer 150 can provide a degree of comfort and firmness depending on the material used, lending to the overall versatility of the cooling platform 100.

The invention contains a large amount of advantages. An advantage of the invention is the composition 110A. The composition 110A is able to be re-used without the need for electricity, refrigeration, additional treatments, or extraneous equipment. The advantage stems from the components within the composition 110A, which effectively keep a temperature of 3-4 degrees Fahrenheit lower than body temperature. This particular composition 110A is able to recharge after the alleviation of pressure (after the object moves). This particular advantage further allows for low-cost and eco-friendly solutions to temperature regulating and aids in the "mobility" aspect of the invention by not requiring input from other sources and by virtue of being a non-toxic substance.

Another advantage of the invention is the unique design. The design enhances and optimizes the cooling performance. The channels 130 allow for a mixture of air flow between the object and the cooling platform 100, effectively cooling the object at a quicker rate. Furthermore, the presence of the predefined distance from the top and bottom of the angled segment 120, essentially prevents the dispersion of the composition 110A from the pressure the object exerts on the cooling platform 100. The overall effect increases the rate of cooling on the targeted object.

Another advantage of the invention is the interconnected pressure portions 110B. The pressure portions 110B provide the ability to increase or decrease the overall pressure of the cooling platform 100. This feature is particularly advantageous given the large variation in object weight.

While certain exemplary embodiments have been described and shown in the accompanying drawings, it is to be understood that such embodiments are merely illustrative and not restrictive of the current invention, and that this invention is not restricted to the specific constructions and arrangements shown and described since modification can occur to those ordinarily skilled in the art.

What is claimed is:

1. An endothermically activated and exothermically deactivated cooling platform comprising:

a temperature regulation layer, wherein the temperature regulation layer has at least one angled segment formed by a top side and a bottom side at a predefined distance, and at least one channel, wherein the channel forms a side by contacting the top side with the bottom side;

an endothermically activated and exothermically deactivated cooling composition contained inside the temperature regulation layer, wherein the endothermically activated and exothermically deactivated cooling platform is repeatedly activatable and deactivatable.

2. The endothermically activated and exothermically deactivated cooling platform as recited in claim 1, wherein the at least one angled segment has a trapezoidal-like shape.

3. The endothermically activated and exothermically deactivated cooling platform as recited in claim 1, wherein the endothermically activated and exothermically deactivated cooling composition does not require refrigeration or freezing prior to use.

4. The endothermically activated and exothermically deactivated cooling platform as recited in claim 1, further comprising a support layer, wherein the support layer comprises an elastic material that deforms and reforms upon the application and release of pressure, respectively.

5. The endothermically activated and exothermically deactivated cooling platform as recited in claim 4, wherein the elastic material is a foam.

6. The endothermically activated and exothermically deactivated cooling platform as recited in claim 1, wherein the endothermically activated and exothermically deactivated cooling composition undergoes an endothermic reaction upon activation.

7. The endothermically activated and exothermically deactivated cooling platform as recited in claim 6, wherein the endothermic reaction is activated by the application of pressure.

8. The endothermically activated and exothermically deactivated cooling platform as recited in claim 1, further comprising a covering layer, wherein the covering layer at least partially encompasses the temperature regulation layer.

9. The endothermically activated and exothermically deactivated cooling platform as recited in claim 1, wherein the endothermically activated and exothermically deactivated cooling composition includes polyacrylamide.

10. The endothermically activated and exothermically deactivated cooling platform as recited in claim 1, wherein the endothermically activated and exothermically deactivated cooling composition includes alginic acid.

11. The endothermically activated and exothermically deactivated cooling platform as recited in claim 1, wherein the endothermically activated and exothermically deactivated cooling composition endothermically activates upon the application of pressure and undergoes a subsequent recharge upon the release of the pressure.

12. The endothermically activated and exothermically deactivated cooling platform as recited in claim 1, further comprising a support layer that is bonded to the temperature regulation layer.

13. An endothermically activated and exothermically deactivated cooling platform comprising:

an outer layer comprising at least one angled segment formed by a top side and a bottom side at a predefined distance, and a sealed perimeter;

an endothermically activated and exothermically deactivated cooling composition contained inside the outer layer, wherein the endothermically activated and exothermically deactivated cooling platform is repeatedly activatable and deactivatable.

14. The endothermically activated cooling platform as recited in claim 13, wherein the at least one angled segment is a single angled segment.

15. The endothermically activated cooling platform as recited in claim 13, wherein the endothermically activated and exothermically deactivated cooling composition does not require refrigeration or freezing prior to use.

16. The endothermically activated cooling platform as recited in claim 13, wherein the endothermically activated and exothermically deactivated cooling composition undergoes an endothermic reaction upon activation.

17. The endothermically activated cooling platform as recited in claim 16, wherein the endothermic reaction is activated by the application of pressure.

18. The endothermically activated cooling platform as recited in claim 13, comprising a support layer positioned in supporting contact with the outer layer, wherein the support layer comprises an elastic material that deforms and reforms upon the application and release of pressure, respectively, and further wherein the elastic material is a foam.

19. The endothermically activated cooling platform as recited in claim 13, further comprising a covering layer, wherein the covering layer at least partially encompasses the outer layer.

20. An endothermically activated and exothermically deactivated cooling platform comprising:
a temperature regulation layer, wherein the temperature regulation layer has at least one angled segment formed by a top side and a bottom side at a predefined distance, and a channel,
wherein the channel forms a side by contacting the top side with the bottom side;
an endothermically activated and exothermically deactivated cooling composition contained inside the temperature regulation layer, wherein the cooling composition does not require electricity, refrigeration, or freezing prior to use,
wherein the endothermically activated and exothermically deactivated cooling composition undergoes an endothermic reaction upon activation,
wherein the endothermic reaction is activated, at least partially, by the application of pressure,
wherein the endothermically activated and exothermically deactivated cooling composition undergoes an exothermic reaction upon deactivation,
wherein the exothermic reaction is achieved by removing the pressure,
wherein the endothermically activated and exothermically deactivated cooling platform is repeatedly activatable and deactivatable.

* * * * *